United States Patent [19]

Maurer

[11] Patent Number: 4,773,443

[45] Date of Patent: Sep. 27, 1988

[54] PRESSURE REDUCER

[75] Inventor: Christoph Maurer, Techau, Fed. Rep. of Germany

[73] Assignee: Drägerwerk Aktiengesellschaft, Lübeck, Fed. Rep. of Germany

[21] Appl. No.: 151,164

[22] Filed: Feb. 1, 1988

[30] Foreign Application Priority Data

Jan. 31, 1987 [DE] Fed. Rep. of Germany ....... 3702959

[51] Int. Cl.[4] ............................................. G05D 10/00

[52] U.S. Cl. ................................................. 137/487.5

[58] Field of Search ............................... 137/487.5, 85

[56] References Cited

U.S. PATENT DOCUMENTS 3,464,438 9/1969 Maurer ............................ 137/487.5
3,482,588 12/1969 Kreuter ................................ 137/85
3,586,027 6/1971 Fitzgerald .................... 137/487.5 X
3,811,465 5/1974 Abbey ............................. 137/487.5
4,061,155 12/1977 Sopha ................................... 137/85
4,596,264 6/1986 Gladstone ............................ 137/85

*Primary Examiner*—Alan Cohan
*Attorney, Agent, or Firm*—Walter Ottesen

[57] ABSTRACT

The invention is directed to a pressure reducer having an outlet pressure which is controllable via a desired value-actual value comparison. The desired value of the outlet pressure is selectable in a simple manner and can be maintained independently of changes of the through-flow or input pressure. This result is achieved by providing a regulating element equipped with a drive device. The control unit is connected to the drive device for actuating the regulating element by means of a regulating control signal determined from the comparison between the desired value of pressure and the measured outlet pressure.

2 Claims, 1 Drawing Sheet

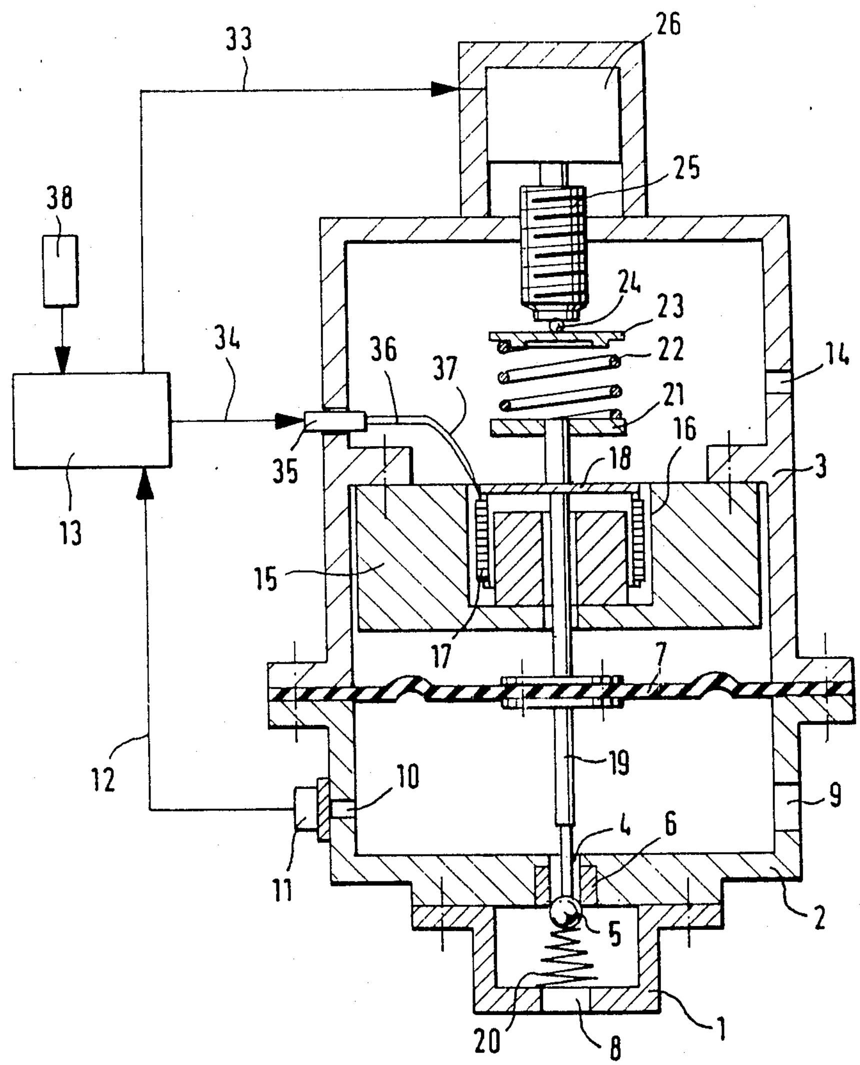
33
26
25
38
24
23
34
36
37
22
14
21
16
18
35
3
13
15
17
7
12
19
10
9
4
6
11
5
2
20
8
1

PRESSURE REDUCER

FIELD OF THE INVENTION

The invention relates to a pressure reducer having an inlet chamber and an outlet chamber. The inlet chamber is connectable to the outlet chamber via a valve which is actuable via a coupling element. This coupling element is attached to a pressure-sensitive membrane which closes off the outlet chamber with respect to the ambient. A pressure sensor senses the pressure in the outlet chamber and is connected to a control unit. The coupling element is movable via the control unit by means of a displacing arrangement which displaces the coupling element in correspondence to a displacement control signal obtained from a comparison of the measured output pressure value and a desired pressure value. The displacing arrangement is adjustable by means of a resilient control element which can be changed with respect to its biasing force.

BACKGROUND OF THE INVENTION

A pressure reducer is disclosed in U.S. Pat. No. 3,811,465. In the pressure reducer disclosed in this patent, the valve is opened by means of a regulating element in the form of an adjustable spring and a displacing arrangement configured as a plunge coil. The regulating element is resiliently biased and preset to a base tension and the valve is opened until an equilibrium is established between the preset outlet pressure which acts on the membrane in the outlet chamber and the counterforce applied to the membrane by the adjustable spring and the plunge coil. The output pressure is continuously monitored by the regulating unit and held to the desired value by means of a control signal applied with the plunge coil. When the force of the output pressure on the membrane is in equilibrium to the oppositely directed force of the adjusting spring and the plunge coil, the regulating path is then, too, in equilibrium so that the valve remains in its center equilibrium position. The plunge-coil drive is only then without current when the biasing force of the regulating element is in equilibrium with the force on the membrane developed by the outlet pressure. That is, only for a single desired value.

It is a disadvantage of the above pressure reducer that a change of the desired outlet pressure is not possible by means of only an adjustment of the regulating element. A change in the biasing force of the regulating element would be compensated by the regulating unit and has no influence on the output pressure. Furthermore, the regulating element is provided only for adjusting purposes and has only a limited adjusting possibility. In addition, a correspondence of the two adjusted values can only be obtained with difficulty by a simultaneous manual adjustment of the regulating element as well as also of the desired-value input of the control unit. However, the deviations lead to a compensation by means of the regulating unit and a loading of the plunge-coil drive. Desired value changes therefore can only occur electrically in that the plunge coil is supplied with a continuous current such that a new equilibrium adjusts itself in correspondence to the changed desired value. The range of desired values adjustable in this manner is limited by the maximum force of the plunge-coil drive.

The pressure reducer described above can therefore only be utilized in a narrow range of desired values when one does not desire to utilize an unnecessarily large drive consuming unnecessary energy.

It should be noted that even when the desired value remains unchanged, further forces act upon the above-described equilibrium on the membrane when, for example, different strokes adjust to correspondingly different through-flows. Different spring forces then occur in correspondence to the spring characteristic. Different in-flow pressures which act from within the inlet chamber on the valve also lead to similar disturbing forces which can only be compensated for by means of the plunge-coil drive in the known pressure reducer.

SUMMARY OF THE INVENTION

In view of the above, it is an object of the invention to provide an improvement of the above-described pressure reducer so that the desired value for the outlet pressure is selected in a simple manner and the selected desired value can be maintained independently of intense changes of the through-flow as well as of the input pressure.

According to a feature of the pressure reducer of the invention, the regulating unit is provided with a drive device and the control unit is connected with the drive device for actuating the regulating unit via a control line. The adjustment of a new rest position occurs via this control line by means of a comparison between the measured outlet pressure and the desired value.

In addition to the control line for the displacing unit, the control unit in this embodiment has a second control line for the regulating unit. Both are actuated in dependence upon one another and, more specifically, signals beneath a limit which can still be handled by the displacing unit without difficulty are directed to the displacing unit. However, signals which exceed this limit are supplied to the drive device of the regulating unit via a second control line and are translated into an adjustment of the spring tension. This applies to signals derived from desired-value/actual-value deviations which arise for different reasons irrespective of whether they are caused by changes in the in-flow pressure, changes of the through-flow capacity or new settings of the desired value. In this way, the displacing unit is only put into use for the limited range of a fine control; whereas, more extensive compensations are carried out in an economical manner by correcting the equilibrium point by means of a spring adjustment. In this way, a pressure reducer is obtained having a desired value which can be initially selected within a wide range by a simple desired-value input to the control unit and the deviations of the outlet pressure from the desired value which is set, can be most precisely corrected with a minimal consumption of energy.

An especially advantageous embodiment of the control unit includes a threaded pin having first and second ends and being mounted in the housing of the pressure reducer so as to be moveable in a direction along its longitudinal axis. With its first end, the threaded pin is connected with a drive unit which, in turn, is connected to the control unit and the second end of the threaded pin is connected with a spring which acts upon the displacing unit. With an appropriate deviation of the actual value from the set desired value, the control unit causes the drive unit to rotate the threaded pin for such a length of time until the spring force acting on the displacing unit reaches the equilibrium position of the membrane.

BRIEF DESCRIPTION OF THE DRAWING

The invention will now be described with reference to the drawing which shows a schematic, partially in section, of the pressure reducer according to the invention.

DESCRIPTION OF THE PREFERRED EMBODIMENTS OF THE INVENTION

The drawing shows a pressure reducer which is comprised of three housing components, namely, the inlet chamber 1, the outlet chamber 2 and the control chamber 3. A passage 4 is provided in the connecting wall 2*a* between the inlet chamber 1 and the outlet chamber 2. The passage 4 is closeable by means of a ball valve (5, 6). The outlet chamber 2 and the control chamber 3 are separated from each other by a membrane 7 which is clamped between the edges of the two chambers (2, 3) with appropriate means such as threaded fasteners. The inlet chamber 1 has an inlet opening 8 and the outlet chamber 2 has an outlet opening 9. A pressure sensor 11 is mounted across the measuring opening 10 and is connected to a control unit 13 via the sensor line 12.

A permanent magnet 15 is fixedly mounted in the control chamber 3 and has a recess 16 in its central region. A plunge coil 17 acts as a displacing element and is accommodated in the recess 16 for axial movement on a carrier 18 to which the plunge coil 17 is attached. The control chamber 3 is connected to the ambient via an opening 14. The carrier 18 of the plunge coil 17 is connected to the membrane 7 via a rod 19. The rod 19 functions as a coupling element and the end of the rod is in contact engagement with the ball 5 of the ball valve (5, 6). The ball 5 is braced by the conical spring 20. The other end of the rod 19 is terminated with a plate disc 21. A helical spring 22 is seated on the disc 21 and held in place with a retainer 23 which presses against a threaded pin 25 via a bearing ball 24. The threaded pin extends through a wall of the control housing 3. Ball 5, rod 19, spring 22 and threaded pin 25 are all coaxially aligned with respect to each other.

The threaded pin 25 is connected to the drive device 26 in a force-tight manner. The threaded pin 25 and the spring 22 together with the drive device 26 conjointly define the regulating unit by means of which the biasing force of the plunge coil 17 is adjusted.

The desired value which is to be regulated by means of the pressure reducer can be supplied to the control unit 13 by means of an appropriate input such as a data-entry keyboard 38. The control unit 13 is connected to the drive device 26 via a control line 33 for transmitting a regulating control signal. For transmitting the displacement control signal, the control unit 13 is connected with the plunge coil 17 via a signal line 34, a through-pass 35 and the connecting lines (36, 37).

For operating the pressure reducer, the desired value is applied via the input 38 to the control unit 13. This input can be applied initially or the desired value can be changed during operation as may be required. The ball 5 lifts away from its seat 6 under the force of the spring 22 and gas flows into the inlet chamber 1 through the inlet opening 8 and then through the valve (5,6) into the outlet chamber 2 and to the outlet opening 9 to a consumer (not illustrated). The outlet pressure in the outlet chamber 2 first adjusts itself so that the force acting on the membrane because of the outlet pressure is in equilibrium with the force acting on the membrane 7 from the spring 22. The outlet pressure is measured by a pressure sensor 11 and is supplied to the control unit 13 as an actual value. The control unit 13 forms a displacement control signal from a comparison of the desired value and the actual value. The displacement control signal is conducted to the plunge coil 17 in the form of a current via the signal line 34. The force generated in this way by the plunge coil 17 is added to the force generated by the spring or subtracted from the latter in accordance with the direction of current and in such a manner that the actual value and the desired value come into coincidence with each other.

If the pressure in the outlet chamber 2 deviates from the desired value because of external operating conditions such that the displacement control signal cannot effect an adequately high counter-force via the plunge coil 17, then the control unit 13 supplies a regulating control signal to the regulating element (22, 25, 26) via the control line 33 in response to which the drive device 26 changes the biasing force of the spring 22 via a corresponding rotation of the threaded pin 25 until the equilibrium between the closure force on the membrane and the opening force via the rod 19 is again restored. The further monitoring of the equilibrium condition is then again effected by means of a follow-up regulation by the plunge coil 17.

It is understood that the foregoing description is that of the preferred embodiments of the invention and that various changes and modifications may be made thereto without departing from the spirit and scope of the invention as defined in the appended claims.

What is claimed is:

1. A pressure reducer comprising:

a housing;

inlet chamber means arranged in said housing and having an inlet opening for admitting a gas;

outlet chamber means arranged in said housing and having an outlet for passing the gas to a consumer;

valve means for connecting said inlet chamber with said outlet chamber and being actuable for opening a passage between said chambers to permit the gas to flow from said inlet chamber to said outlet chamber;

a pressure-responsive membrane mounted in said housing so as to seal off said outlet chamber with respect to the ambient;

a coupling member attached to said membrane and movably mounted in said housing for actuating said valve means;

displacement means for displacing said coupling member in response to a displacement control signal;

pressure-sensor means for sensing the actual pressure of the gas in said outlet chamber and transmitting a first input signal indicative of said actual pressure;

a regulating unit for applying an adjustable resilient biasing force to said displacement means, said regulating unit including: resilient biasing means for applying a resilient biasing force to said displacement means; and, drive means operatively connected to said resilient biasing means for adjusting the biasing force developed by the latter in response to a regulating control signal;

desired-value input means for supplying a second input signal indicative of the desired pressure to which the gas in said outlet chamber means is to be regulated by said pressure reducer; and, control unit means for receiving and comparing said first and second input signals for generating said displacement control signal and for generating said regulating control signal, said control unit means being connected to said displacement means for transmitting said displacement control signal to the latter and being connected to said drive means for transmitting said regulating control signal thereto.

2. The pressure reducer of claim 1, said drive means including: a threaded pin having first and second ends and being mounted in said housing so as to be movable in a direction along its longitudinal axis; and, a drive unit electrically connected to said control unit means and mechanically connected to said first end for imparting movement to said threaded pin in response to said regulating control signal; and, said resilient biasing means being a spring interposed between said second end and said displacement means for imparting said biasing force to the latter.

* * * * *

UNITED STATES PATENT AND TRADEMARK OFFICE

CERTIFICATE OF CORRECTION

PATENT NO. : 4,773,443

DATED : September 27, 1988

INVENTOR(S) : Christoph Maurer

It is certified that error appears in the above-identified patent and that said Letters Patent is hereby corrected as shown below:

In column 1, line 36: delete "with" and substitute -- to -- therefor.

In column 1, line 38: delete "to" and substitute -- with -- therefor.

Signed and Sealed this

Thirteenth Day of June, 1989

*Attest:*

DONALD J. QUIGG

*Attesting Officer*

*Commissioner of Patents and Trademarks*